United States Patent [19]

Semons

[11] Patent Number: 5,311,648
[45] Date of Patent: * May 17, 1994

[54] CLOSURE ATTACHMENT ASSEMBLY

[76] Inventor: William Semons, 14 Highland Ave., Salem, Mass. 01970

[ * ] Notice: The portion of the term of this patent subsequent to Nov. 26, 2008 has been disclaimed.

[21] Appl. No.: 801,652
[22] Filed: Dec. 2, 1991
[51] Int. Cl.⁵ .............................................. A44B 19/00
[52] U.S. Cl. ........................................ 24/381; 24/387; 24/419; 135/115
[58] Field of Search ............. 135/117, 87; 52/DIG. 4, 52/DIG. 13; 2/247, 248, DIG. 6; 24/381, 383, 385, 387, 405, 410, 411, 419, 422, 429

[56] References Cited

U.S. PATENT DOCUMENTS

| Re.19,128 | 4/1934 | Drew . | |
|---|---|---|---|
| Re. 28,969 | 9/1976 | Naito . | |
| 2,114,683 | 4/1938 | Kates | 24/381 |
| 2,122,681 | 7/1938 | Dykes . | |
| 2,359,012 | 9/1944 | Sophier | 2/247 |
| 2,382,930 | 8/1945 | Williams . | |
| 2,408,688 | 10/1946 | Schonthal . | |
| 2,483,604 | 10/1949 | Abramson . | |
| 2,550,000 | 4/1951 | Brady . | |
| 2,638,650 | 5/1953 | Breier . | |
| 2,671,903 | 3/1954 | Breul | 2/247 X |
| 2,768,922 | 10/1956 | Klein . | |
| 2,978,769 | 4/1961 | Harrah . | |
| 3,006,793 | 10/1961 | Wheeler . | |
| 3,169,543 | 2/1965 | McGerty | 135/117 X |
| 3,217,335 | 11/1965 | Bell | 2/247 X |
| 3,346,883 | 10/1967 | Ersek . | |
| 3,518,991 | 7/1970 | Goss . | |
| 3,546,721 | 12/1970 | Cleary . | |
| 3,547,136 | 12/1970 | Prinz . | |
| 3,685,103 | 8/1972 | Severino . | |
| 3,696,472 | 10/1972 | Perina et al. | 52/DIG. 13 X |
| 3,785,014 | 1/1974 | Canepa . | |
| 3,785,614 | 1/1974 | Enomoto . | |
| 3,948,705 | 4/1976 | Ausnit . | |
| 4,265,261 | 5/1981 | Barker | 135/117 X |
| 4,341,575 | 7/1982 | Herz . | |
| 4,354,541 | 10/1982 | Tilman . | |
| 4,561,109 | 12/1985 | Herrington . | |
| 4,691,373 | 9/1987 | Ausnit . | |
| 4,703,518 | 10/1987 | Ausnit . | |
| 4,719,935 | 1/1988 | Gustafson | 52/DIG. 13 X |
| 4,881,546 | 11/1989 | Kaessmann . | |
| 5,067,207 | 11/1991 | Semons . | |

FOREIGN PATENT DOCUMENTS 717622 10/1954 United Kingdom .................. 24/419

Primary Examiner—Carl D. Friedman
Assistant Examiner—Lan C. Mai
Attorney, Agent, or Firm—Terry M. Gernstein

[57] ABSTRACT

A closure assembly can be mounted on a cover, such as tarpaulin, or the like, and an opening through the cover defined beneath the closure assembly to permit movement through the opening while also permitting the opening to be sealed as necessary. The opening can be large enough to permit a motor vehicle to be driven through the cover, as in a situation where a cover is used to close a building access door, or the opening can be sized to permit a person to move through the cover.

6 Claims, 2 Drawing Sheets

CLOSURE ATTACHMENT ASSEMBLY

TECHNICAL FIELD OF THE INVENTION

The present invention relates to the general art of closures, and to the particular field of reusable closures.

BACKGROUND OF THE INVENTION

Many different items are covered by tarpaulins or the like to protect such items and devices from damage. An automobile is one common example of such covered items. A tarpaulin or other such covering item is placed over an automobile to protect the automobile from damage from exposure to the sun, to dirt, or the like. Other examples of such covered items include boats, construction, agricultural equipment and any sort of land, marine or air vehicle. Even some aircraft are often simply covered instead of placing such aircraft in a hanger.

Building openings are also often closed by placing a covering over such opening. A cargo access opening to either a building or to a vehicle can be covered in this manner.

While quite helpful and advantageous, such coverings have several drawbacks which inhibit the full commercial success thereof.

One problem is associated with the secure nature of the covering item itself. Once in place, many covering elements do not permit easy or expeditious access to the covered item. For example, if a boat is covered, ingress to the boat, or egress from the boat is severely inhibited, if not totally prevented by the cover. This is also a problem if a cover is used to close an access opening to a building. Traffic, both vehicular and personnel, cannot easily pass through the cover without endangering the integrity of the cover closure.

Furthermore, if a cover is used to prevent access of personnel, locks must be provided. While some covers can be strong enough to prevent unauthorized access to a building when sealed to the building, it is not always easy to maintain this secure feature if traffic through the access opening is also permitted.

Often, the cover is designed to fit snugly and securely about the item being protected and such design feature can be vitiated by the need for access to the covered item. For example, repeatedly lifting and replacing a cover from and to a covered item may weaken, or even destroy, the attaching features associated therewith.

Therefore, there is a need for an element which can be used in conjunction with a covering element to permit that covering element to securely and snugly cover an item yet will still permit easy and expeditious access through the cover without vitiating the covering feature thereof, and which can be used in association with a wide variety of different covering elements.

OBJECTS OF THE INVENTION

It is a main object of the present invention is to provide an element which can be used in conjunction with a covering element to permit that covering element to securely and snugly cover an item.

It is a another object of the present invention to provide an element which can be used in conjunction with a covering element to permit that covering element to securely and snugly cover an item yet will still permit easy and expeditious access through the cover without vitiating the covering feature thereof.

It is another object of the present invention to provide an element which can be used in conjunction with a covering element to permit that covering element to securely and snugly cover an item yet will still permit easy and expeditious access through the cover without vitiating the covering feature thereof, and which can be used in association with a wide variety of different covering elements.

It is another object of the present invention to provide a covering element that can be used to lockably cover a building access opening or an object while still permitting authorized access to that building or object.

SUMMARY OF THE INVENTION

These, and other, objects are achieved by a unitary closure attachment which includes a monolithic, one-piece base having a closure mechanism secured thereto with the base completely surrounding the closure mechanism. A preferred form of the closure mechanism includes two flaps with hook means on one flap and loop means on the other flap. The flaps are releasably coupled together by the hook-and-loop means. The flaps are attached to a base that spaces those flaps from a cover. The base includes adhesive on one surface and is attached to the cover at the desired location of the opening. Because the flaps are spaced from the cover, the flaps can be opened, and the cover cut with a knife or the like, to define an opening beneath the closure mechanism. The flaps are opened and closed to open and close the cover. Suitable locks can be place on the flaps, as by having a hasp on the flaps, with a padlock used to keep the flaps closed.

By being completely surrounded by a monolithic, one-piece base, the closure mechanism can be used on large items, such as covers used to cover a boat, airplane, car, or the like and can also be used on covers used to close access doors to buildings, cargo vehicles and the like. The cover can thus have an access opening defined therein that is large enough to accommodate a person walking through the opening, or even be large enough to permit a vehicle to be driven through the opening. The opening can then be re-closed and re-opened as often as desired without vitiating the secure and snug nature of the fit between the cover and the supporting surfaces.

An access hole can be defined through the cover in any suitable location, at any suitable orientation and in any suitable size for the most advantageous use of the cover, with the hole being openable and closable as many times as necessary. The access hole can be as large or as small as desired to achieve the purposes of the cover as determined by the user.

The closure attachment assembly, being monolithic and one-piece, is extremely strong and thus can be repeatedly used in conjunction with such large openings while still providing a secure seal when closed so the basic integrity of the cover will not be nullified or endangered. The hook-and-loop means also can be operated from either side and can include locking elements on the flaps so that element can be locked from one side, for example from the inside of a building.

The assembly of the present invention further includes adhesive on a base so the assembly can easily and expeditiously be mounted on a cover. The assembly further includes a protective cover that is releasably held on the base by the adhesive. The protective cover is also monolithic and one-piece so it can be easily removed. This is an especially attractive feature for large assemblies, such as might be used on a building cargo access door where the closure assembly must be large, yet capable of being easily mounted on the cover.

BRIEF DESCRIPTION OF THE DRAWING FIGURES

FIG. 1 is a perspective view of a cover that is suitable for use as a protective element for a vehicle or for covering a building access opening, or the like.

DETAILED DESCRIPTION OF THE PREFERRED EMBODIMENT OF THE INVENTION

Figure 1:
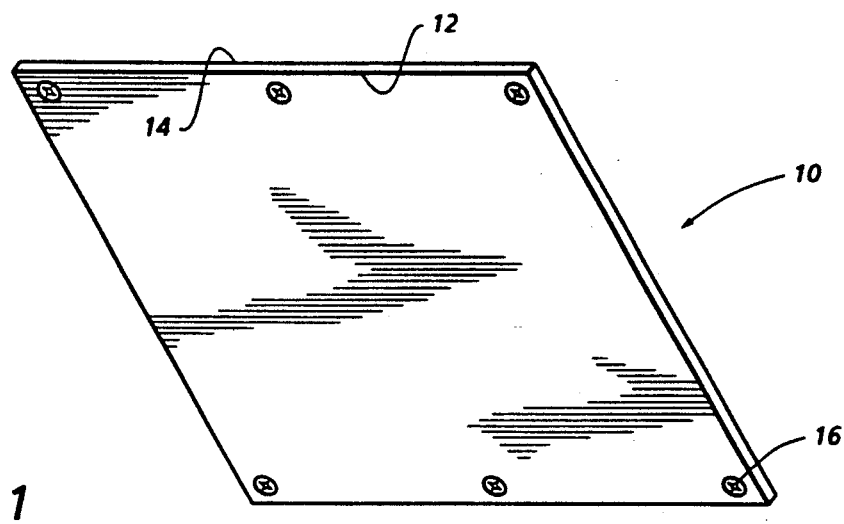

Shown in FIG. 1 is a cover, such as tarpaulin 10, that is suitable for use in covering a vehicle, such as a boat, a car, an airplane or the like. The cover can be formed of any suitable material and is shown as being polygonal in shape, but can be any suitable shape. The cover 10 includes a top surface 12 and a bottom surface 14 which could be an inside surface and an outside surface in the case of a building. The cover can be attached to a building or other suitable support surface using fastener holes, such as hole 16 and will securely cover the item or area of interest.

Figure 2:
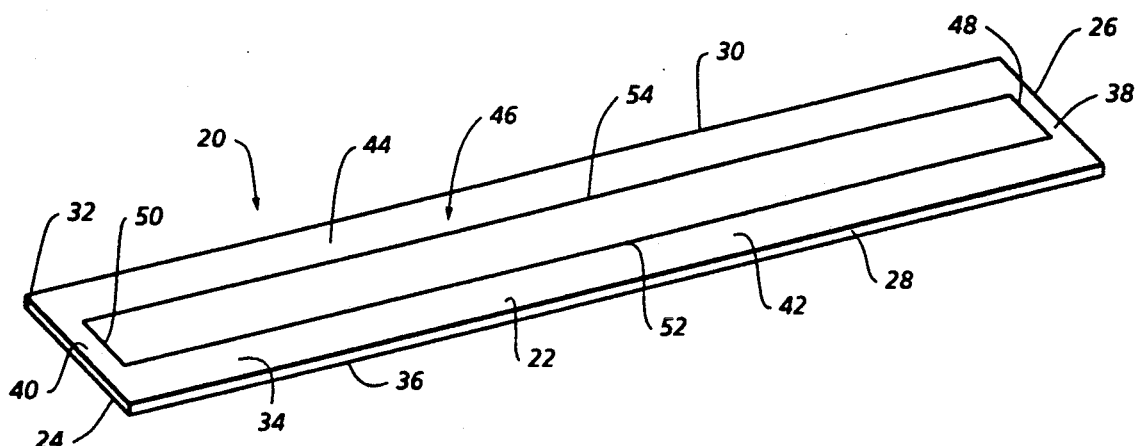
FIG. 2 is a perspective view of a closure attachment assembly embodying the present invention in the closed configuration.
Figure 3:
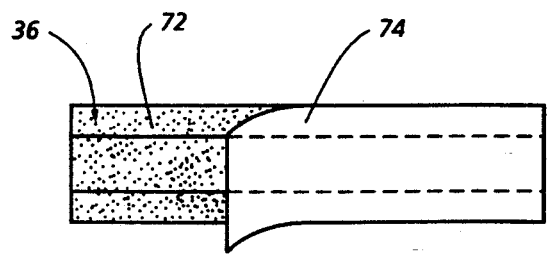
FIG. 3 is a rear elevational view of the closure attachment assembly of the present invention, showing a protective cover element partially peeled off and uncovering adhesive on the back of the assembly.

In order to provide access through the cover 10, the present invention provides a closure attachment assembly 20, best shown in FIGS. 2 and 3. The closure attachment assembly is as small or as large as required, and can be large enough to permit a vehicle, even a large cargo semitrailer truck, to pass through an opening defined through the cover, while permitting the opening to be re-closed in a secure manner.

The closure attachment 20 includes a monolithic, one-piece base 22 that is polygonal in outer peripheral shape and has two ends 24 and 26, and two sides 28 and 30 which intersect to form corners, such as corner 32. The base has a width dimension defined between the sides and a length dimension defined between the ends, a front surface 34 and a back surface 36. The front surface is defined with reference to a cover on which the assembly 20 will be mounted as will be understood from the ensuing discussion.

An opening is defined though the base 22 and extends along the length dimension of the base from adjacent to and spaced from one end edge 26 to adjacent to and spaced from the other end edge 24 and has sides that extend along and spaced from the base side edges 28 and 30 respectively. The opening is sized to be large enough to accommodate any item or person that is expected to pass through the cover 10. For example, if the cover is to be used to cover an access opening into a cargo building, the opening through the closure attachment base should be large enough so that, when it is open, a person or a cargo vehicle can pass through the closure attachment assembly 20 via the opening. The opening is polygonal and, in the preferred form of the invention, is square or rectangular.

By being spaced from the base side and end edges, the opening has a border completely surrounding it. This border includes a first end area 38 adjacent to base end 26, a second end area 40 adjacent to base end 24, a first side area 42 adjacent to base side 28 and a second side area 44 adjacent to the base second side 30. The border is monolithic and one-piece and thus adds strength to the assembly so that when the assembly is used in conjunction with a large hole in the cover 10, the assembly is not likely to tear around that hole.

A closure mechanism 46 is securely attached to the base 22 adjacent to the opening through that base and is completely surrounded by the border of the base. The closure mechanism includes a first closure end 48 adjacent to the first base border end area 38, a second closure end 50 adjacent to the second border end area 40, a first closure side 52 adjacent to the base border first side area 42 and a second closure side 54 adjacent to the base border second side area 44. The closure mechanism is attached to the base adjacent to the border areas so that the closure mechanism sides and ends are spaced from the corresponding sides and ends of the base. Thus, the border surrounding the closure mechanism on all peripheral edges thereof is monolithic and one-piece so that strength of the mechanism is assured.

The closure mechanism 46 includes a first flap 56 and a second flap 58 that are each attached to the base. Flap 56 has hook means thereon and flap 58 has loop means thereon so the two flaps will be releasably held together when pressed against each other. The hook means on one flap mate with loop means on the other flap to close the closure mechanism and are released from such mating engagement by pulling one flap away from the other.

The closure mechanism can be a two-way means which can be opened from either end thereof if so desired.

Figure 4:
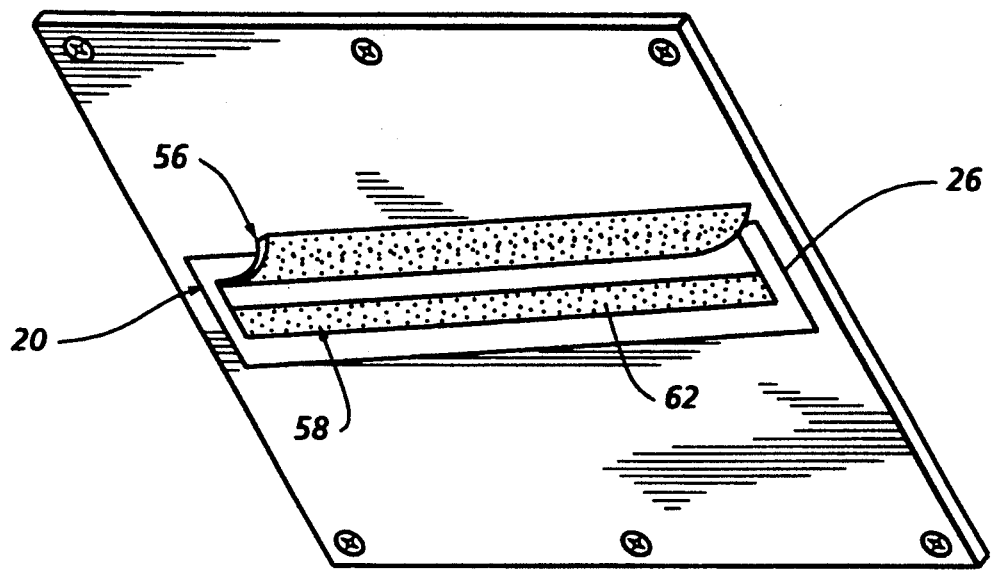
FIG. 4 is a top perspective view of the FIG. 1 cover having the closure attachment mounted thereon and partially open with both flaps thereof partially folded back to expose the cover beneath the closure mechanism.

As is best shown in FIG. 3, the base back 36 is covered with adhesive material 72 which will adhere to the cover 10 when applied to a surface thereof. For the sake of convenience, the cover surface to which the closure adhesive is applied will be referred to as the top surface of the cover. The adhesive 72 covers the entire area of the back surface, and the mechanism includes a protective cover 74 that is releasably held on the back surface of the base by the adhesive. The protective cover is simply removed prior to applying the closure mechanism to the cover 10, and the closure mechanism is applied to the cover at the suitable location and in the suitable orientation so the adhesive 72 secures the closure mechanism in place on the cover. The closure mechanism is shown in FIG. 4 as being applied to the cover 10.

Figure 5:
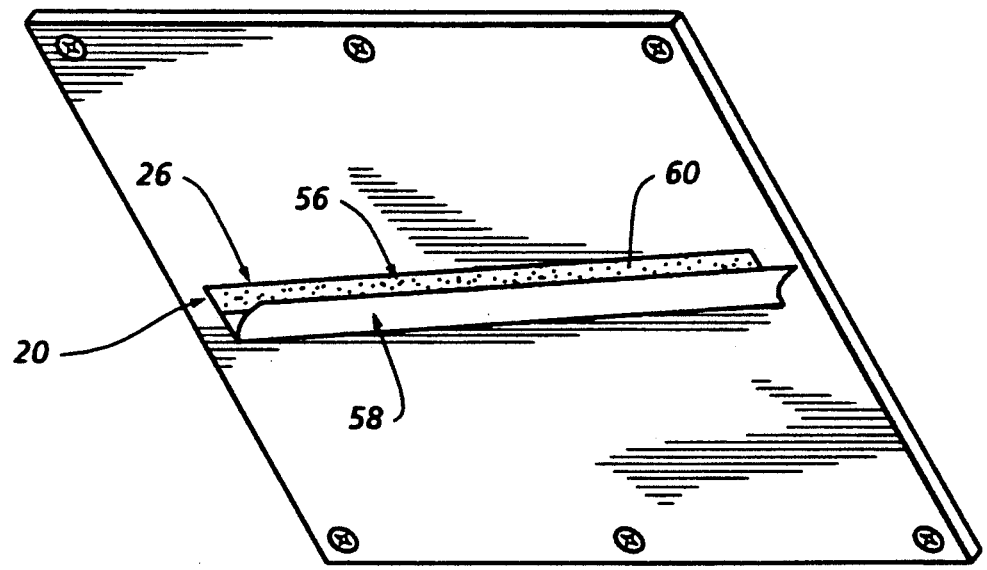
FIG. 5 is a rear perspective view similar to FIG. 4.

The base of the closure mechanism spaces the flaps from the surface of the cover to which the closure mechanism is attached. This spacing permits the flaps to be operated even before the cover has had an opening defined therethrough beneath the closure mechanism. Once the closure mechanism is mounted on the cover in the desired location, the closure flaps are operated to open the closure mechanism by pulling one flap away from the other as shown is indicated in FIGS. 4 and 5. This operation will expose the cover beneath the closure mechanism, and this exposed cover is then simply cut with a knife or the like to open a hole through the cover. The base 22 will also be slit by the knife as it is used to define the hole through the cover. The closure flaps are then operated by pulling one of the flaps back into the FIG. 4 position, and then re-closed by re-engaging the two flaps into the FIG. 2 position to close that open hole. The closure mechanism can be operated from either side of the cover. This operation is indicated in FIGS. 4 and 5 where the flaps are shown to be partially folded back.

As was mentioned above, the closure mechanism can include a lock assembly which permits the closure assembly to be locked. This feature is especially useful if the assembly is used on a cover for a building access opening. As indicated in FIG. 4, a lock assembly 70 includes a hasp mechanism mounted on the flaps with the hasp mechanism being located between the flaps and the closure mechanism base to be positioned on the inside of a building when the closure mechanism is mounted on a cover. A padlock can be inserted through the hasp to keep the flaps closed. Using a lock assembly, the access opening of a building can be locked in the manner of other doors by simply closing the flaps and attaching a padlock to the hasp mechanism located inside the building.

It is understood that while certain forms of the present invention have been illustrated and described herein, it is not to be limited to the specific forms or arrangements of parts described and shown.

I claim:

1. A unitary closure attachment assembly comprising:
   A) a monolithic one-piece base having two outside end edges, two outside side edges, a front surface and a back surface, said base being mounted on a mounting element at said back surface with said front surface facing away from said mounting element, said back surface and said mounting element defining a pocket therebetween;
   B) a closure mechanism mounted on said base front surface adjacent to and spaced from both of said outside side edges and adjacent to and spaced from both of said outside end edges to be completely surrounded by said base, said base having a monolithic border completely surrounding said closure mechanism, said closure mechanism having a first end located adjacent to and spaced from a first outside end edge of said base end edges, a second end located adjacent to and spaced from a second outside end edge of said base end edges, a first side located adjacent to and spaced from one outside side edge of said base side edges, a second side located adjacent to and spaced from a second outside side edge of said base side edges, said closure mechanism being openable to define an access opening;
   C) said closure mechanism being spaced from said base back surface to be spaced from said mounting element on which said base back surface is mounted, said base being located beneath said access opening;
   D) adhesive material on said base back surface and covering essentially the entire base back surface;
   E) a monolithic, uninterrupted one-piece protective cover releasably attached to said base back surface via said adhesive material to cover essentially the entire base back surface and which is removed prior to mounting said base on said mounting element; and
   F) a base opening defined through said base beneath said access opening, said base opening including a first end located adjacent to said closure mechanism first end, a second end located adjacent to said closure mechanism second end, said border completely surrounding said opening on all peripheral locations of said opening.

2. The unitary closure attachment defined in claim 1 wherein said closure mechanism includes a first flap connected to said base front surface, and a second flap connected to said base front surface, said flaps being spaced from said base surface back surface to be spaced from said mounting element on which said base back surface is mounted.

3. The unitary closure attachment defined in claim 2 further including a lock mechanism, said lock mechanism including a hasp element mounted on said flaps.

4. The unitary closure attachment defined in claim 3 further including hook-and-loop fastening means on said flaps.

5. The unitary closure attachment assembly defined in claim 4 wherein at least one flap of said flaps contacts said base border and said border surrounds said closure mechanism.

6. The unitary closure attachment assembly defined in claim 5 wherein said first and second flaps are in overlapping relationship to each other.

* * * * *